J. H. CRANSTON.
Cam.

No. 217,068.  Patented July 1, 1879.

Attest:
F. H. Schott
D. P. Cawl

Inventor:
John H. Cranston
by Teustgen & Co.
attys

UNITED STATES PATENT OFFICE.

JOHN H. CRANSTON, OF NORWICH, CONNECTICUT.

IMPROVEMENT IN CAMS.

Specification forming part of Letters Patent No. 217,068, dated July 1, 1879; application filed April 3, 1879.

*To all whom it may concern:*

Be it known that I, JOHN H. CRANSTON, of Norwich, in the county of New London and State of Connecticut, have invented certain new and useful Improvements in Cams; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improvement in the method of constructing the cams used upon various machines, by which they are rendered capable of adjustment to any desired point upon the shaft to which they are attached, and are securely fastened in position upon said shaft without the aid of keys or set-screws, and without cutting or otherwise injuring the surface of the shaft, as must be the case where either keys or set-screws bearing upon the shaft are used; and the invention consists in constructing the cam with a split hub, which is provided with screws that allow it to be so tightly clasped upon the shaft as to prevent its rotation thereon, all as hereinafter fully described.

Figure 1:
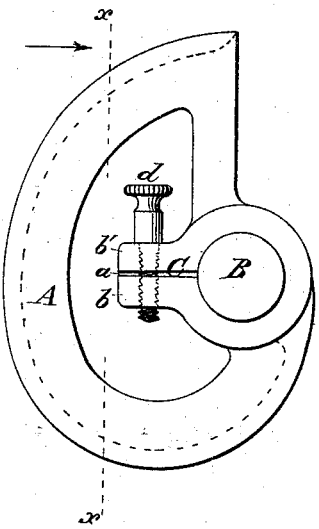
Figure 2:
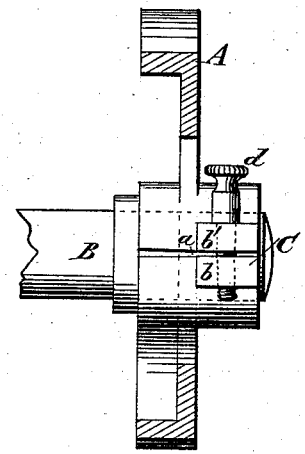
Figure 3:
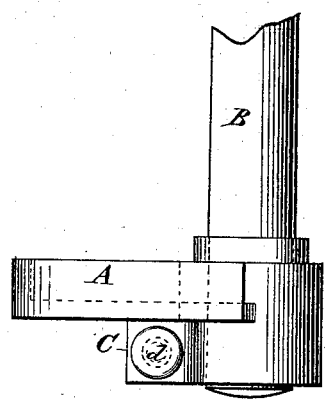

Figure 1 of the drawings is a side view of the cam. Fig. 2 is a section on the line $x\ x$ of Fig. 1. Fig. 3 is a plan, showing the cam and part of a shaft to which it is attached.

The cam is represented in the drawings by the letter A, and may be of any of the numerous forms in use; the purpose to be effected by it governing its shape. B is a shaft, to which the cam A is attached. As it often becomes a very difficult matter to determine the exact position of a cam upon its shaft in order to make it act in concordance with the movement of some other parts of the machine, it has been common to insert one or more set-screws through the hub of the cam, which was then placed upon the shaft in the machine, and its proper position determined by actual trial. The ends of these set-screws coming in forcible contact with the shaft embed themselves therein, and thus hold the cam in place; but as at each fixing of the cam the set-screws form a burr upon the shaft, it soon becomes almost or quite impossible to move the cam upon it.

Another method of holding the cam consists in forming a key-seat in its hub, into which is inserted a hardened-steel key having a concave face, the concavity forming a section of a circle of less diameter than that of the shaft upon which the cam is placed, so that when the key is forced into the seat in the hub of the cam, its concave edges cut into the shaft, and thus hold the cam in place; but this method of holding also burrs up the shaft, and is nearly as bad as the method of holding the cam by set-screws.

To obviate these defects I form the hub of the cam with a projection, C, which is afterward cut through by the slot $a$, so as to form the two lips $b$ and $b'$; or this slot may be formed by a core inserted in the proper place in the mold at the time of casting. Connecting these lips is a screw or bolt, $d$, turning freely in one lip and acting upon a screw-thread in the other.

Now, it is evident that if the hub of the cam be bored to exactly fit the shaft B before cutting or otherwise opening the slot $a$, the screw $d$ will draw the lips together, so that the hole in the hub of the cam would have a less diameter than the shaft; and if the cam were in place upon the shaft and the screw turned up, the hub of the cam would clasp the shaft so tightly as to prevent any movement of the latter without producing a corresponding movement of the cam, and upon releasing the screw the cam might be turned upon the shaft without difficulty; and this process of securing and releasing the cam to and from the shaft may be repeated indefinitely without leaving any mark, or in the slightest degree marring the surface of the shaft.

Having thus described my invention, I claim as new, and desire to secure by Letters Patent, the following:

1. A cam provided with a slotted hub and screw or bolt for contracting the shaft-orifice in the same, substantially as and for the purpose set forth.

2. The cam A, provided with the projecting lips $b$ and $b'$, divided by the slot $a$, in combination with the screw or bolt $d$ and shaft B, as and for the purpose specified.

In testimony that I claim the foregoing I have hereunto set my hand this 25th day of March, 1879.

JOHN H. CRANSTON.

Witnesses:
  LUCIUS BROWN,
  CHARLES E. DYER.